(12) United States Patent
Jaeker et al.

(10) Patent No.: US 12,078,226 B2
(45) Date of Patent: Sep. 3, 2024

(54) ENERGY GUIDE CHAIN HAVING A CABLE-PROTECTING INTERNAL SUBDIVISION, AND CHAIN LINK AND FRAME MODULE THEREFOR

(71) Applicant: IGUS GMBH, Cologne (DE)

(72) Inventors: Thilo-Alexander Jaeker, Sankt Augustin (DE); Dominik Barten, Meckenheim (DE); Peter Mattonet, Kuerten (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 18/043,412

(22) PCT Filed: Aug. 27, 2021

(86) PCT No.: PCT/EP2021/073703
§ 371 (c)(1),
(2) Date: Feb. 28, 2023

(87) PCT Pub. No.: WO2022/048995
PCT Pub. Date: Mar. 10, 2022

(65) Prior Publication Data
US 2023/0323933 A1    Oct. 12, 2023

(30) Foreign Application Priority Data
Sep. 1, 2020   (DE) ..................... 20 2020 105 039.7

(51) Int. Cl.
*F16G 13/16*    (2006.01)
(52) U.S. Cl.
CPC ................... *F16G 13/16* (2013.01)

(58) Field of Classification Search
CPC ....................................................... F16G 13/16
See application file for complete search history.

(56) References Cited

U.S. PATENT DOCUMENTS 5,014,506 A  *  5/1991  Moritz .................... F16G 13/16
                                                           59/78.1
5,048,283 A      9/1991  Moritz et al.
(Continued)

FOREIGN PATENT DOCUMENTS

DE          3928238      10/1990
DE       202019100430     6/2019
(Continued)

OTHER PUBLICATIONS

International Search Report from corresponding PCT Appln. No. PCT/EP2021/073703, dated Jan. 3, 2022.
(Continued)

*Primary Examiner* — Monica E Millner
(74) *Attorney, Agent, or Firm* — Grossman, Tucker, Perreault & Pfleger, PLLC

(57) ABSTRACT

A chain link for an energy transmission chain, comprising two mutually spaced side plates which are interconnected by means of two crosspieces, delimit an interior for guiding cables and each have inner faces facing the interior. A frame module is provided and is mounted between the crosspieces, borders a portion of the interior and delimits at least one guide chamber for the purpose of internal subdivision. The frame module has two lateral walls and two transverse regions extending transversely thereto, wherein each transverse region covers part of the inner face of a crosspiece and forms a cable-protecting support face.

13 Claims, 2 Drawing Sheets

(56) References Cited

U.S. PATENT DOCUMENTS

| | | | | |
|---|---|---|---|---|
| 5,201,885 A | * | 4/1993 | Wehler | H02G 11/006 |
| | | | | 59/900 |
| 6,176,072 B1 | * | 1/2001 | Weber | F16G 13/16 |
| | | | | 59/78.1 |
| 6,423,901 B2 | | 7/2002 | Richter | |
| 6,745,555 B2 | | 6/2004 | Hermey et al. | |
| 7,013,630 B2 | * | 3/2006 | Komiya | F16G 13/16 |
| | | | | 59/900 |
| 7,493,750 B2 | * | 2/2009 | Komiya | F16G 13/16 |
| | | | | 248/51 |
| 8,733,077 B2 | * | 5/2014 | Garcia | F16G 13/16 |
| | | | | 59/900 |
| 9,328,795 B2 | | 5/2016 | Blase et al. | |
| 2006/0219421 A1 | * | 10/2006 | Kitagawa | F16G 13/16 |
| | | | | 174/19 |
| 2015/0001022 A1 | * | 1/2015 | Jaeker | H02G 11/00 |
| | | | | 191/12 C |
| 2019/0360555 A1 | * | 11/2019 | Hermey | F16G 13/16 |
| 2022/0090651 A1 | | 3/2022 | Hermey et al. | |

FOREIGN PATENT DOCUMENTS

| | | |
|---|---|---|
| EP | 0415034 | 3/1991 |
| EP | 1108278 | 11/2002 |
| EP | 1564438 | 8/2005 |
| WO | 02086349 | 10/2002 |
| WO | 2012131033 | 10/2012 |

OTHER PUBLICATIONS

International Preliminary Report on Patentability from corresponding PCT Appln. No. PCT/EP2021/073703, dated Dec. 21, 2022.

\* cited by examiner

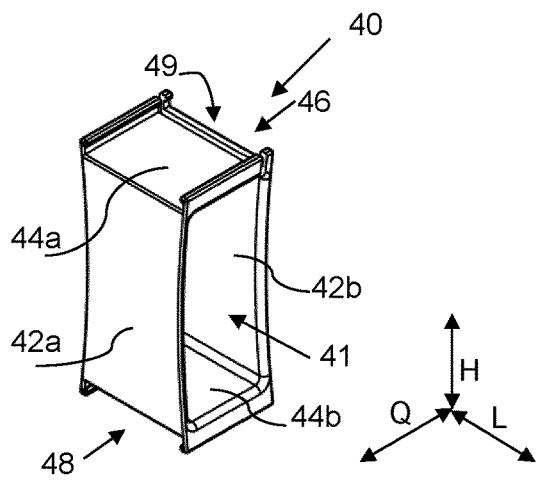
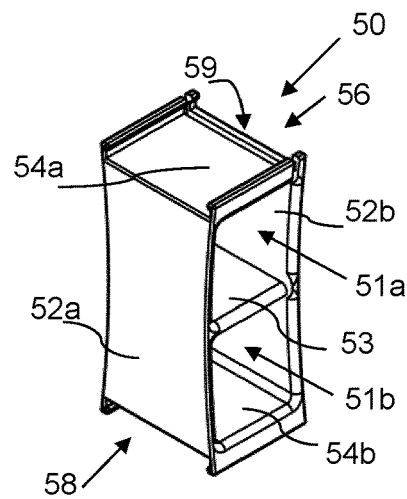
FIG.4　　　　　　FIG.5
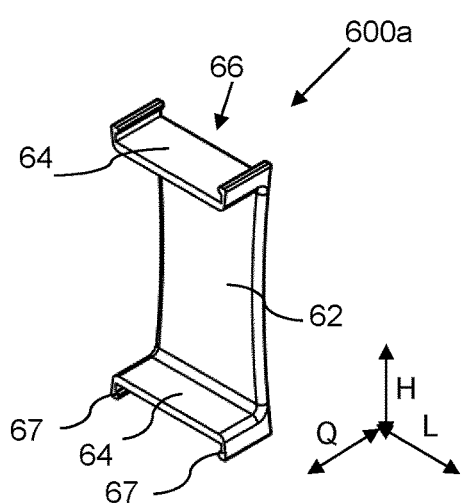
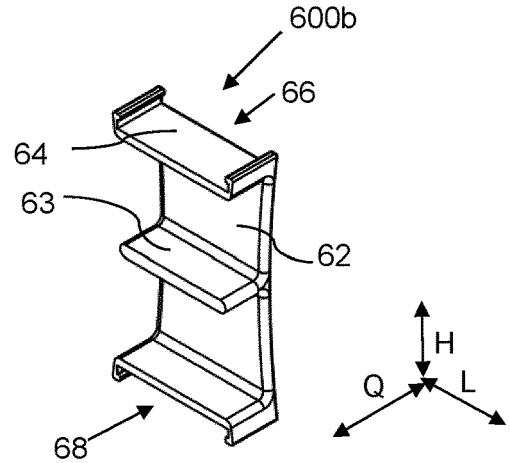
FIG.6A　　　　　　FIG.6B
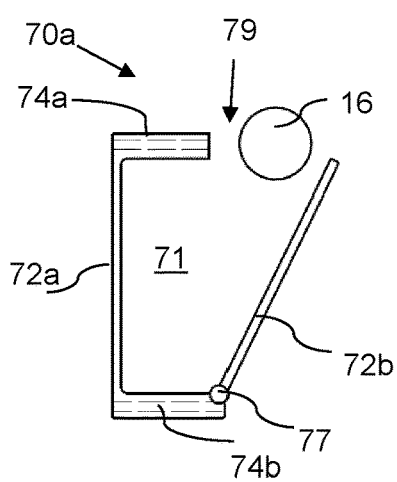
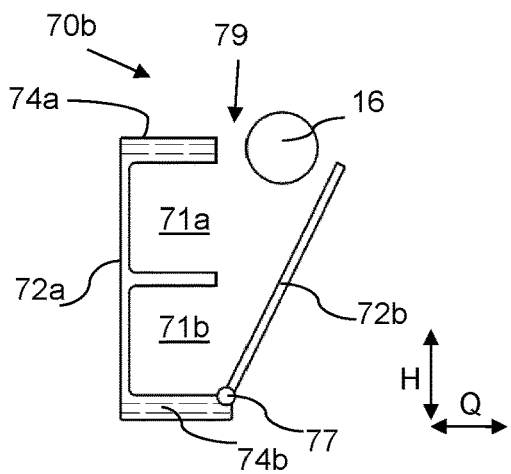
FIG.7A　　　　　　FIG.7B

ENERGY GUIDE CHAIN HAVING A CABLE-PROTECTING INTERNAL SUBDIVISION, AND CHAIN LINK AND FRAME MODULE THEREFOR

FIELD

The invention relates generally to the field of energy guide chains for guiding lines such as cables, hoses and the like in a protected and dynamic manner, and in particular to a modular kit with one or more frame modules for line-protecting internal subdivision for energy guide chains. The invention specifically also relates to a chain link having a line-protecting internal subdivision. Chain links typically comprise two mutually spaced-part side plates which are connected to one another by two crossbars and which delimit an interior space for guiding lines and which in each case have inner surfaces facing toward the interior space.

The invention furthermore relates to a frame module as a separate component for line-protecting internal subdivision of a chain link of an energy guide chain.

BACKGROUND

Energy guide chains are typically constructed in an articulated manner from chain links which are pivotably connected to one another in a longitudinal direction and which have two side plates spaced apart from one another transverse to the longitudinal direction. These are, at least in the case of some of the chain links, connected to one another stably by at least one crossbar, often also two crossbars, and define an interior space or guide channel open in the longitudinal direction for the lines to be guided. Crossbars can be fixedly connected to the side plates or removable or can be capable of being swung out. In the present case, removable or swing-out crossbars, i.e. those which make it possible to open the chain link (so-called opening crossbars), are also referred to generally as crossbars.

Energy guide chains typically have two ends, which are movable relative to one another and which are in each case connected to a connection point, and guide supply lines from one connection point to the other. Here, a typical energy guide chain moves back and forth between the connection points, forming two strands and a deflecting bend between the strands. In the deflecting bend, the direction of the respective strand is reversed.

For internal subdivision, it is known to subdivide the interior space of a chain link using separators and/or shelves, with the result that the lines can be guided in an orderly manner and do not become tangled. Here, separators are typically vertical and shelves are typically horizontal.

Components of a chain link such as side plates, crossbars, separators and shelves are in each case usually designed plate-like and are normally produced either from fiber-reinforced plastic of considerable hardness or from sheet metal. During movement of the energy guide chain, inevitable relative movements result in rubbing of the guided lines against the side plates, crossbars, separators and shelves, in particular in the region of the deflecting bend. The contact with the surface of the components can cause abrasion of the lines, in particular in the case of electrical lines, which normally have an outer sheath made of a softer plastic. The plate-like components of a chain link, which lie in the transverse direction, are typically spaced apart in the longitudinal direction by free spaces. Thus, contact with edges of the plate-like components of the chain link can e.g. also lead to abrasion and wear of the guided lines.

Against this background, a chain link having a line-protecting internal subdivision has already been proposed in EP 1 564 438 A2. The surfaces of the side plates, of the crossbars, of the separators and of the shelves according to EP 1 564 438 A2 which face toward the interior space or the guide channel are lined with a special friction-reducing coating. This known solution requires chain links made of specially coated side plates and crossbars in which the coated separators and shelves can be installed, even afterwards. In order to equip an existing energy guide chain suitably for the purposes of reducing abrasion, the inner surfaces of the side plates and of the crossbars of the chain links must also be coated. This is very complex in terms of process technology and is associated with high expenditure on production. Upgrading is scarcely possible. This known solution is therefore associated with considerable expenditure during production and is scarcely suitable for upgrading or maintenance.

SUMMARY

An object of the present invention is therefore to propose a chain link having a line-protecting internal subdivision which makes a particularly easy and fast production and fitting, and also easy upgrading and simplified maintenance of the chain link, possible.

In the case of a generic chain link, this is already achieved in that a frame module is fitted between the two crossbars of the chain link and substantially frames a sub-region of the interior space. In the present case, the term "frame module" refers to one or more installation frames which can be installed modularly. For the purposes of internal subdivision, the frame module delimits at least one guide space for at least one line, i.e. circumferentially around the longitudinal direction or in cross section perpendicular to the longitudinal direction.

Here, the frame module can comprise two side walls and two transverse regions running transverse to the side walls, wherein each of the transverse regions in each case covers a part of the inner surface of a crossbar and forms a line-protecting bearing surface, which faces toward the guide space of the frame module, for at least one line.

The invention furthermore relates to such a frame module per se for the purposes of line-protecting internal subdivision of a chain link of an energy guide chain, wherein the frame module is designed as a separate single-part or multi-part unit and is thus suitable for fitting or inserting into the interior space of a chain link and is optionally also removable again, e.g. for replacement or if access to lines is required during maintenance.

According to the invention, the frame module can be fitted between crossbars of a chain link in order to substantially frame a sub-region of the interior space and, for the purposes of internal subdivision, to delimit at least one guide space for at least one line. Here, the frame module can comprise two side walls and two transverse regions running transverse to the side walls, wherein each transverse region is formed to cover in each case a part of the inner surface of a crossbar and to form a line-protecting bearing surface for one or more lines. Here, the term "cover" is to be understood in a broad sense as meaning that the transverse regions primarily prevent the lines arranged in the frame module from making contact with the crossbars. Continuously covering or overlapping surfaces are advantageous for this purpose but are not strictly necessary. A complete overlapping is possibly also not necessary.

The frame module is in the shape of a frame in a cross section transverse to the longitudinal direction. The cross section can in particular be rectangular or generally box-shaped, preferably with internally rounded corners and face edges. The frame of the frame module however need not be completely closed in the circumferential direction, i.e. need not be fully circumferential.

The frame module can thus simultaneously perform the function of the separators known per se for energy guide chains in the case of the internal subdivision, inter alia to prevent tangling of the guided lines, and, according to the invention, can additionally provide line-protecting coverage of the crossbars and of the side plates.

A part of the guide surfaces or the surfaces of a chain link which delimit the guide channel for guiding lines and which can as intended come into contact with the guided lines can thus be provided by the line-protecting frame module(s). The frame modules can partially divide up the interior space.

Particularly preferably all guide surfaces for all lines in the interior space are provided by one or more frame modules, with the result that no lines come into contact with actual structural components of the chain link, in particular with the side plates and crossbars.

An aim here is to keep guidance-related abrasion as low as possible by protecting all lines, by means of associated frame modules, against contact with structural components of the chain link. Guidance-related abrasion can thus be minimized.

This can also give rise to electrical insulation, which is advantageous e.g. in the case of chain links made of metal.

An internal subdivision arranges the guided lines in separate guide spaces in a simple manner, and at the same time reduces wear which can arise as a result of tangling of the lines and rubbing thereof against the crossbars and side plates.

Here, the internal subdivision according to the invention achieves increased protection against wear, and thus protects the lines.

In addition, the internal subdivision according to the invention is particularly effective in reducing abrasion, in particular by reducing abrasion caused by rubbing of the outer sheath of the lines against the chain links. By reducing the particles released from the lines during operation, the invention is therefore particularly advantageous for cleanroom applications or similar applications where abrasion is critical.

The frame module preferably consists of at least one module element, which is designed as a separate component. Existing energy guide chains can also be upgraded with the frame module by inserting the module elements of the frame module into the chain links between the crossbars.

The frame module can also consist of two or more identical or different module elements. Different module elements can in particular differ in width, i.e. in their dimension in the transverse direction, and can be identical in the depth direction or the longitudinal direction and in the height direction transverse to the longitudinal and transverse directions. Different module elements can be lined up against one another, in particular directly against one another, along a crossbar, i.e. in the transverse direction. Thus, from a number of different module elements, a kit system can be provided for the selective configuration of frame modules depending on the desired internal subdivision and dimensioning of the chain link.

In particular, the entire inner side of a crossbar of a chain link can be covered with the module elements from one side plate to the other, with the result that the interior space of the chain link can be advantageously utilized for guiding lines.

The frame module comprises, preferably and at least on the inner surfaces which face toward the lines, an abrasion-reducing plastic or a plastic which, with typical plastics for the outer sheath of flexible electrical lines, forms a material pairing which, with regard to abrasion reduction, reduces abrasion in relation to typical plastics of the structural components of the chain link. Here, the frame module preferably comprises a sliding-optimized plastic, and is in particular produced from, or in particular consists of, a sliding-optimized plastic. The plastic can be a sliding-optimized thermoplastic, in particular a sliding-optimized polyethylene (PE), sliding-optimized HD-PE (high density polyethylene) and/or sliding-optimized UHMW-PE (ultra high molecular weight polyethylene). The plastic of the frame module can and advantageously is to have a friction-reducing action in relation to the material of the crossbars or of the side plates, and can in particular be self-lubricating. The plastic of the frame module can in particular have a lower coefficient of static and/or dynamic friction than the material of the crossbars or of the side plates, if this coefficient of friction under the same conditions, inter alia with the same sliding partner.

The frame module can have at least one fastening device and be fastened by means thereof in a positive-locking and/or friction-locking manner to at least one of the crossbars.

The frame module can have two fastening devices for fastening in each case to one of the crossbars.

The two fastening devices can be structurally identical.

The frame module can in particular be designed mirror-symmetrical relative to a plane which runs parallel to the transverse regions and transverse to the side walls. The advantage of this simple embodiment is above all the simplification of assembly, because the frame module cannot be installed in an incorrect orientation.

The respective fastening device can preferably be provided and/or formed on the outside of the respective transverse region, preferably designed as a single piece with the transverse region.

In an advantageous embodiment, the fastening device is formed as a retaining bracket for interacting with narrow sides of a crossbar. The retaining bracket can in particular be designed as a detent connector or clip connector. Here, a transverse region of a frame module can have two edge regions, which project or protrude outward from the line-protecting bearing surface and relative to the guide space for a positive-locking and/or friction-locking fastening to the narrow sides of a crossbar. The retaining bracket can e.g. be formed L-shaped or C-shaped in cross section transverse to the longitudinal direction. The crossbar can have fastening strips known per se at its narrow sides, such as e.g. fastening strips for the fastening of separators, comprising in particular a row of teeth and/or a retaining groove, wherein the edge regions of the transverse region of a frame module can be formed for interaction with conventional fastening strips of crossbars. In an embodiment, an insertion opening, in particular a narrow and enlargeable insertion gap, can be provided for the insertion of at least one line in the transverse direction. Here, the side wall can preferably be designed flexible or be bent open in order to enlarge the insertion gap and make it possible to access the guide space of the frame module for the insertion or removal of at least one line in the transverse direction. The lines are hereby prevented from having to be pulled in axially, and the maintenance of the lines is thus simplified.

The insertion opening can e.g. be provided centrally in a side wall or preferably between a side wall and a transverse region of the frame module. A side wall of the frame module can thus be connected only to one transverse region; an insertion gap can be provided between the other transverse region of the frame module and this side wall, or on one side, with the result that the side wall can have a free edge and the insertion gap can be temporarily enlarged.

A joint, e.g. a hinge or integral hinge or the like, can alternatively or additionally be provided, which connects a side wall to a transverse region of the frame module, wherein, opposite the joint, the side wall has a free end and adjoins an insertion opening.

The frame module can in particular be designed single-part and consist of only one module element.

Alternatively, the frame module can be designed multi-part and comprise at least two module elements, which in particular are in each case designed as a single piece and in each case have two transverse regions and at least one side wall. This allows a modularly combinable, in particular with regard to the subdivision width, internal subdivision made of few individual parts. The module elements forming a frame module need not imperatively be fastened to one another, they can merely be fastened adjacently to one another, preferably directly adjacently to one another, on a crossbar and form a circumferential frame around the longitudinal direction, which can also be divided up.

Each of the module elements is preferably formed for fastening on both sides to both crossbars. Thus, each module element, in the intended installed state, can be connected to both crossbars simultaneously.

The transverse regions are preferably in each case designed as a single piece with at least one of the side walls.

A module element can e.g. have one side wall and two transverse regions, or two side walls and two transverse regions.

In a simple embodiment, the side walls can run parallel to one another, and the transverse regions can run perpendicular to the side walls. This embodiment is particularly space-saving and makes optimum utilization of the chain link interior space possible.

The frame module or the module element can have at least one shelf between the transverse regions, which divides up the guide space of the frame module. The at least one shelf can in each case be designed as a single piece with at least one of the side walls.

The at least one shelf can be designed plate-like and run parallel to the transverse regions and perpendicular to at least one side wall.

Each transverse region can preferably have rounded end surfaces at the bearing surface for the purposes of providing edge protection for the guided lines. In this embodiment, the lines entering or exiting the chain link in the longitudinal direction can be protected against rubbing against the longitudinal edges of the crossbars.

The crossbars, the side plates and the frame modules are preferably in each case produced by injection molding or assembled from components produced by injection molding.

The invention furthermore relates to an energy guide chain for guiding lines such as cables, hoses or the like in a protected manner between two connection points that are movable relative to one another, wherein the energy guide chain comprises chain links according to one of the above embodiments.

At least the majority of the chain links of the energy guide chain can be formed according to one of the above embodiments. The energy guide chain preferably consists substantially of such chain links.

The invention is particularly suitable for being combined with or used in cleanroom-compatible energy guide chains, which are per se already designed abrasion-reducing. Such energy guide chains can in particular have flexible joint elements for connecting the chain links, as proposed by the applicant e.g. in WO 02/086349 A1 or in WO 2012/131033 A1.

BRIEF DESCRIPTION OF THE DRAWINGS

Further details, features and advantages of the invention are to be found in the following, more detailed description of preferred embodiment examples on the basis of the attached figures. Purely by way of example, there are shown in:

FIG. 4: a third embodiment example of a frame module in a perspective view;

FIG. 5: a fourth embodiment example of a frame module in a perspective view;

FIGS. 6A, B: perspective views of module elements for a frame module according to a fifth embodiment example; and FIGS. 7A, B: further embodiment examples of a frame module in a front view.

DETAILED DESCRIPTION

Figure 1A:
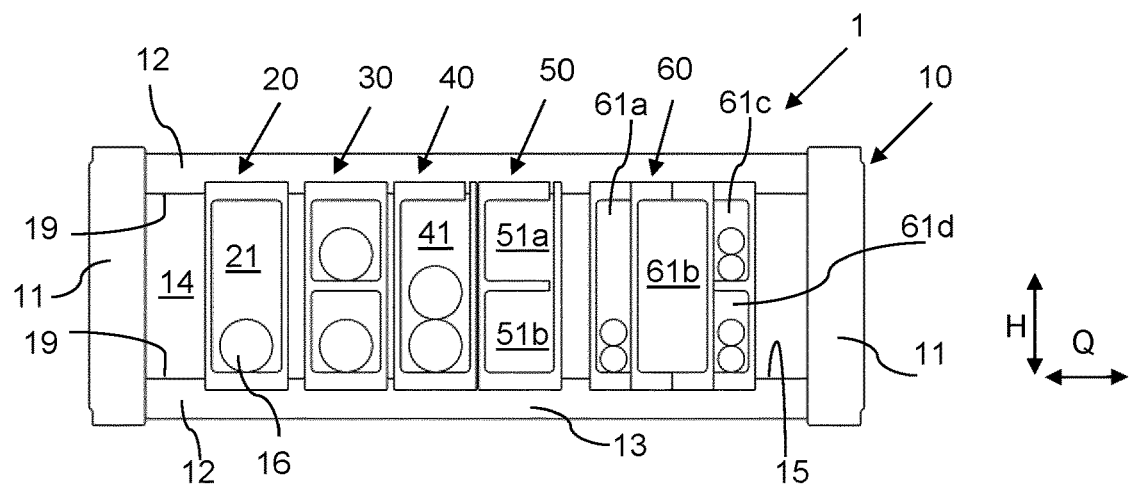
FIGS. 1A, B: an embodiment example of a chain link of an energy guide chain populated purely by way of example with lines and with an internal subdivision, in a front view (FIG. 1A) and in a perspective view (FIG. 1B)

FIG. 1A illustrates, in a front view along the longitudinal direction L of a chain link 10 of an energy guide chain 1, an example internal structure or internal subdivision of the energy guide chain 1 for the purposes of actively guiding lines 16, such as e.g. cables and hoses. The energy guide chain 1 is assembled from a multiplicity of chain links 10, which are connected to one another pivotably, in a longitudinal direction L perpendicular to the plane in FIG. 1A. Here, the chain links 10 likewise consist of individual parts and have at least two side plates 11, which are fixedly connected by two parallel, identical crossbars 12 to form a stable framework and which are held spaced apart in the transverse direction Q of the energy guide chain 1 and parallel to one another. For this purpose, the crossbars 12 are detachably fastened to the side plates 11 by means of terminal fastening regions, e.g. by means of clamping receptacles on horns (not shown) of the side plates 11. The side plates 11 and crossbars 12 delimit an interior space 14 for guiding lines 16. The construction of an energy guide chain 1 is known and can be as desired, e.g. with cranked side plates or alternating inner and outer link plates as side plates 11. In particular, two-part chain links also come into consideration, in the case of which the two side plates and one crossbar are produced from one piece, i.e. single-part, and only the other crossbar is detachable (not shown).

In the embodiment example shown, purely by way of example, the chain link 10 comprises five differently configured frame modules 20, 30, 40, 50 and 60. Each of the frame modules 20 to 60 is fixedly inserted as a separate unit between the crossbars 12 with respect to the height direction H and between the side plates 11 with respect to the transverse direction Q, and is held on the narrow sides 13 of the two crossbars 12. The side plates 11 and the crossbars 12 are produced from a fiber-reinforced plastic, e.g. fiber-reinforced polyamide, by injection molding. Here, the frame modules 20, 30 and 40, 50 are in each case produced as a single part from sliding-optimized HD-PE by injection molding. By contrast, in this example, the frame module 60 is assembled from four individual module elements 600a, 600b. The module elements 600a, 600b are in each case produced as a single part from sliding-optimized HD-PE by injection molding.

The frame modules 20 to 50 are shown in perspective views in FIG. 2 to FIG. 5 and are single-part or consist in each case of only one module element.

Figure 2:
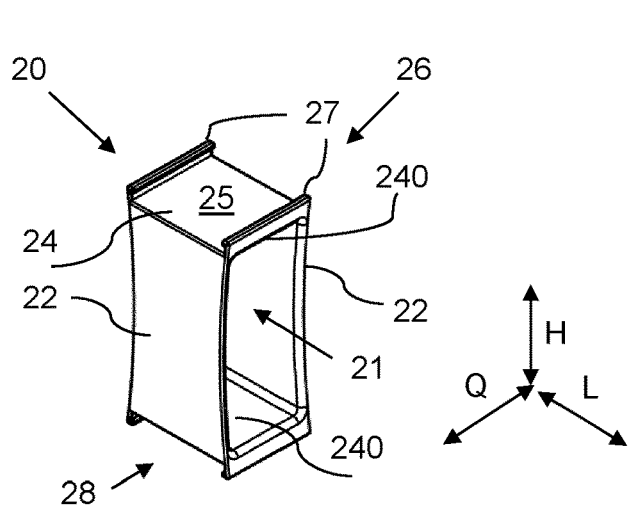
FIG. 2: a first embodiment example of a frame module in a perspective view.

FIG. 2 shows a particularly simple embodiment example of a frame module 20, which is designed as a single-part rectangular frame which frames a guide space 21. In this example, the guide space 21 is accessible only along the longitudinal direction L for the leadthrough of the lines 16. The frame has two identical side walls 22 and two identical transverse regions 24, which run perpendicular to the side walls 22. In this example, each side wall 22 is directly connected to, or produced as a single part with, both transverse regions 24. The transverse regions 24 in each case have a retaining bracket 26, 28 on the outside. The retaining brackets 26 and 28 respectively shown at the top and bottom in FIG. 2 are designed identical and have, on the outside of the respective transverse region 24, in each case two L-shaped edge regions 27, which can in each case engage in a groove (not shown) on the narrow sides 13 of the crossbar 12 in order to fasten the frame module 20 to the crossbars 12 in a positive-locking and friction-locking manner. If the frame module 20 is fitted in the interior space 14 of the chain link 10, as shown in FIG. 1A, the retaining brackets 26, 28 clasp the edge 19 of the respective crossbar 12, wherein the flat part of the respective transverse region 24 covers the inner surface 15 of the respective crossbar 12. The lines 16 guided in the guide space 21 thus do not come into contact with the material of the side plates 11 or of the crossbars 12. The transverse regions 24 in each case form, on the side facing toward the guide space 21 of the frame module 20, line-protecting bearing surfaces 240 for the lines 16. The transition from the respective bearing surface 240 to the respective edge region 27 is rounded in order to protect the lines 16.

Figure 3:
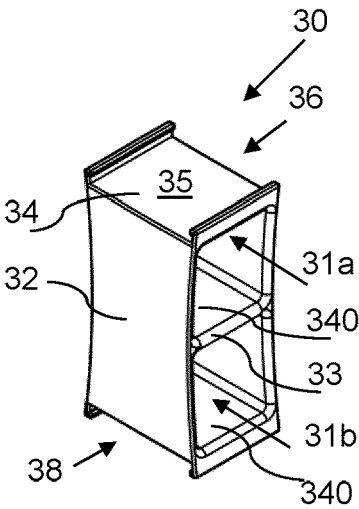
FIG. 3: a second embodiment example of a frame module in a perspective view.

FIG. 3 shows a further embodiment example of the frame module 30, which differs from the frame module 20 merely in that it additionally comprises a shelf 33 which runs parallel to the transverse regions 34 and perpendicular to the side walls 32 and which is directly connected to the two side walls 32 or is produced as a single piece with the two side walls 32. The shelf 33 divides the guide space of the frame module 30 into two separate and identical guide spaces 31a, 31b for in each case one line 16, and forms additional bearing surfaces 340. The narrow sides of the shelf 33 are rounded.

FIG. 4 shows a third embodiment example of the frame module 40, which differs from the frame module 20 merely in that it does not form a frame closed around the longitudinal direction L, but has an insertion gap or an insertion opening 49 between one side wall 42b and one transverse region 44a. The insertion opening 49 can be used for inserting and removing lines 16 by bending or pivoting the side wall 42b to the side in order to reversibly enlarge the insertion opening 49. The side wall 42b is preferably flexible, e.g. resiliently elastic, and produced as a single piece with the transverse region 44b, with the result that no joint is required. A joint, e.g. an integral hinge for swinging out the side wall 42b, also falls within the scope of the invention. The side wall 42a is produced as a single piece with the two transverse regions 44a and 44b.

FIG. 5 shows a fourth embodiment example of the frame module 50, which differs from the frame module 40 merely in that it additionally comprises a shelf 53, which runs parallel to the transverse regions 54 and perpendicular to the side walls 52a, 52b and which divides the guide space of the frame module 50 into two separate, and in this example identical, guide spaces 51a, 51b for in each case one line 16. The shelf 53 is directly connected to, or produced as a single piece with, only one side wall 52a, in the manner of a cantilever.

In the alternative examples in FIGS. 7A-7B, the pivotable side wall 72b of the frame module 70a, 70b is connected by means of a hinge 77 to one of the transverse regions 74b, which makes it possible to enlarge the insertion opening 79 in order to insert one or more lines 16 into the guide space 71 or 71a, 71b. Otherwise, the frame module 70a is designed identical to the frame module 40 in FIG. 4 and the frame module 70b is designed identical to the frame module 50 in FIG. 5.

Figure 1B:
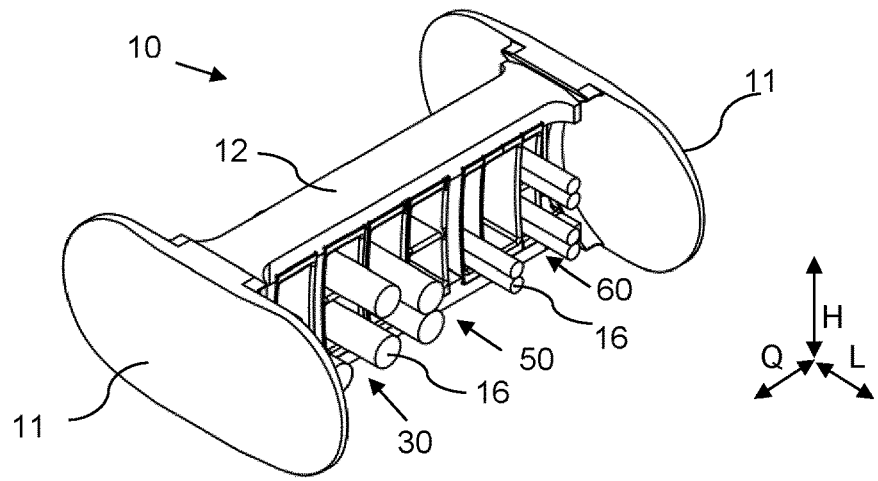

The frame module 60 in FIG. 1 consists of multiple, in this case four, modularly assembled, in each case single-part module elements: three module elements 600a and one module element 600b. The module elements in each case have one side wall 62 and two transverse regions 64. The module 600b additionally has a shelf 63. The module elements 600a, 600b are fastened adjacently to one another to the crossbars 12 such that they form a frame module 60 which has four separate guide spaces for lines: 61a, 61b, 61c, and 61d. The transverse regions 64 in each case cover a part of the inner surface 15 of the crossbar 12, with the result that it cannot come into contact with the lines 16 guided in the guide spaces 61a, 61b, 61c, 61d. FIGS. 6A, B show the module elements 600a, 600b in detail. Each module element has in each case a retaining bracket 66, 68 on the outer sides, facing away from the guide space, of the transverse regions 64. The respective retaining bracket 66, 68 comprises two L-shaped edge regions 67 for positive-locking and/or friction-locking fastening to narrow sides 13 of the crossbars 12. Two or more module elements 600a, 600b can form a closed frame around a sub-region of the interior space 14 of a chain link 10 when they are fastened adjacently to one another on the crossbar 12, with the result that the adjacent module elements 600a, 600b come into direct contact with one another.

LIST OF REFERENCE NUMBERS

FIGS. 1A, B:
1 Energy guide chain
10 Chain link
11 Side plate
12 Crossbar
13 Narrow side of the crossbar
14 Interior space of the chain link
15 Inner surface of the crossbar
16 Line
19 Edge of the crossbar
20, 30, 40, 50, 60 Frame module
21, 31, 41, 51, 61 Guide space of the frame module
H Height direction
L Longitudinal direction Q Transverse direction
FIGS. 2, 3:
20, 30 Frame module
21, 31a, 31b Guide space of the frame module
22, 32 Side wall
33 Shelf
24, 34 Transverse region
25, 35 Outer side of the transverse region
27 Edge regions
26, 28, 36, 38 Retaining bracket
240; 340 Line-protecting bearing surface
H Height direction
L Longitudinal direction
Q Transverse direction
FIGS. 4, 5:
40, 50 Frame module
41, 51a, 51b Guide space of the frame module
42a, 42b, 52a, 52b Side wall
53 Shelf
44a, 44b, 54a, 54b Transverse region
46, 48, 56, 58 Retaining bracket
49, 59 Insertion opening
H Height direction
L Longitudinal direction
Q Transverse direction
FIGS. 6A, 6B:
600a, 600b Module element
62 Side wall
63 Shelf
64 Transverse region
66, 68 Retaining bracket
67 Edge regions
H Height direction
L Longitudinal direction
Q Transverse direction
FIGS. 7A, 7B:
16 Line
70a, 70b Frame module
71, 71a, 71b Guide space
72a, 72b Side wall
74a, 74b Transverse region
77 Hinge
79 Insertion opening

What is claimed is:

1. A chain link for an energy guide chain for guiding lines between two connection points that are movable relative to one another, having a line-protecting internal subdivision, the chain link comprising two mutually spaced-apart side plates which are connected to one another by two crossbars and which delimit an interior space open in a longitudinal direction for guiding lines, and which in each case have inner surfaces facing toward the interior space, wherein:
a frame module is mounted between the two crossbars, wherein the frame module substantially frames a sub-region of the interior space and, for the purposes of internal subdivision, delimits at least one guide space in cross section perpendicular to the longitudinal direction; and
the frame module comprises two side walls and two transverse regions running transverse thereto, wherein each transverse region in each case covers a part of the inner surface of a crossbar and forms a line-protecting bearing surface for the purposes of line-protecting internal subdivision, wherein the transverse regions are in each case formed in one piece with at least one of the side walls.

2. A frame module for line-protecting internal subdivision of a chain link of an energy guide chain, wherein the chain link has two mutually spaced-apart side plates which are connected to one another by two crossbars and which delimit an interior space open in a longitudinal direction for guiding lines, and which in each case have inner surfaces facing toward the interior space, wherein the frame module is mountable between crossbars of a chain link in order, in the mounted state, to substantially frame a sub-region of the interior space and, for the purposes of internal subdivision, to delimit at least one guide space in cross section perpendicular to the longitudinal direction, wherein the frame module comprises two side walls and two transverse regions running transverse thereto, wherein each transverse region is formed to cover in each case a part of the inner surface of a crossbar and to form a line-protecting bearing surface for lines for the purposes of line-protecting internal subdivision, wherein the transverse regions are in each case formed in one piece with at least one of the side walls.

3. A device according to claim 1, wherein the frame module consists of at least one module element, which is designed as a separate component and/or which comprises a friction-reducing or sliding-optimized plastic, in particular is produced from a sliding-optimized plastic.

4. The device according to claim 3, wherein:
the frame module has a fastening device and is fastened in a positive-locking and/or force-locking manner to at least one of the crossbars; or
the frame module has two fastening devices for fastening in each case to one of the crossbars, wherein the two fastening devices are structurally identical, and wherein the frame module is in particular designed mirror-symmetrical relative to a plane which runs parallel to the transverse regions and transverse to the side walls; wherein the fastening devices are provided and/or formed preferably on the outside of a transverse region.

5. The device according to claim 4, wherein the fastening device is formed as a retaining bracket in order to interact in a positive-locking and/or force-locking manner with narrow sides of a crossbar.

6. The device according to claim 3, wherein an insertion opening for a line is provided, preferably between a side wall and a transverse region, wherein the side wall is preferably designed bendable.

7. The device according to claim 3, wherein:
the frame module is designed single-part; or
the frame module is designed multi-part and comprises at least two module elements, which in particular are in each case designed as a single piece and in each case have two transverse regions and at least one side wall.

8. The device according to claim 6, wherein each of the module elements is formed for fastening on both sides to both crossbars.

9. The device according to claim 3, wherein the side walls run parallel to one another, and the transverse regions run perpendicular to the side walls.

10. The device according to claim 3, wherein, between the transverse regions, the frame module has at least one shelf, which divides up the guide space of the frame module and which forms additional bearing surfaces for lines.

11. The device according to claim 3, wherein each transverse region has rounded end surfaces at the bearing surface for the purposes of providing edge protection for the guided lines.

12. The device according to claim 3, wherein the crossbars, the side plates and the frame modules are in each case produced by injection molding or assembled from components produced by injection molding.

13. An energy guide chain for guiding lines such as cables, hoses or the like between two connection points that are movable relative to one another, wherein the energy guide chain comprises chain links according to claim 1.

* * * * *